(12) United States Patent
Sogaishi

(10) Patent No.: US 6,439,114 B1
(45) Date of Patent: Aug. 27, 2002

(54) ELECTRIC PRESS WITH DUST GENERATION PREVENTING DEVICE

(75) Inventor: Ichiro Sogaishi, Tokyo (JP)

(73) Assignee: Janome Sewing Machine Co., Ltd., Tokyo (JP)

( * ) Notice: Subject to any disclaimer, the term of this patent is extended or adjusted under 35 U.S.C. 154(b) by 0 days.

(21) Appl. No.: 09/494,650

(22) Filed: Jan. 31, 2000

(30) Foreign Application Priority Data

Feb. 2, 1999 (JP) .......................................... 11-025543

(51) Int. Cl.[7] ................................................ B30B 1/00
(52) U.S. Cl. ........................ 100/214; 100/231; 100/299; 100/229 A
(58) Field of Search ................................ 100/214, 231, 100/269.17, 229 A, 120, 289, 299, 90, 92; 454/244, 287, 62, 49, 64; 15/347

(56) References Cited

U.S. PATENT DOCUMENTS

| | | | |
|---|---|---|---|
| 4,944,220 A | * 7/1990 | Fox | 100/229 A |
| 4,989,506 A | * 2/1991 | McCormick | 100/229 A |
| 5,012,732 A | * 5/1991 | Fox | 100/229 A |
| 5,129,317 A | * 7/1992 | Gloe et al. | 100/231 |
| 5,295,902 A | * 3/1994 | Hock | 454/66 |
| 5,306,207 A | * 4/1994 | Courts | 454/49 |
| 5,348,704 A | * 9/1994 | Tanaka | 100/229 A |
| 5,355,789 A | * 10/1994 | Suzuki et al. | 100/92 |
| 5,389,346 A | * 2/1995 | Copeland, Jr. | 100/229 A |
| 5,740,725 A | * 4/1998 | Tomizawa et al. | 100/92 |

* cited by examiner

*Primary Examiner*—Stephen F. Gerrity
*Assistant Examiner*—Louis Huynh
(74) *Attorney, Agent, or Firm*—Lowe Hauptman Gilman & Berner, LLP

(57) ABSTRACT

An electric press with dust generation preventing device, especially used in a clean spaced room, is disclosed, wherein the electric press has the essential elements including a pressing ram, an electric drive motor and a transmission provided between the drive motor and the pressing ram and transmitting the driving force of the drive motor to the pressing ram to reciprocatingly move the ram relative to a work to be pressingly processed, the electric press substantially comprises a casing structured airtight for covering the essential elements, an pipe elongated and having one end thereof being located within the casing and the opposite end being located in an open air outside of the clean spaced room and an air absorbing means provided in connection with said pipe and operated to cause the air in the casing to flow through said pipe out into the open air outside of the clean spaced room.

13 Claims, 9 Drawing Sheets

ELECTRIC PRESS WITH DUST GENERATION PREVENTING DEVICE

BACKGROUND OF THE INVENTION

1. Field of the Invention

The invention relates to an electric press and more particularly relates to an electric press provided with a device for preventing the electric press from generating dusts while the electric press is operated especially in a clean spaced factory and/or in a product studying and researching room.

2. Prior Art

The precision instruments and electronic parts are generally protected from dusts while these instruments and parts are assembled and/or manufactured so as to avoid the risk that the dusts will come into the instruments and the parts and deteriorate the quality of the same. Under the circumstances, many factories have a clean spaced room, or the factories themselves are made clean spaced to protect such instruments and parts from the dusts.

In the clean spaced room, the workers are generally forced to take on the working clothes which will not generate dusts. In this connection, the machine tools and testers which are used in the clean spaced room are required to have a function for preventing the dusts from being generated. The dust generation preventing function mentioned herein is the function which will prevent the dusts which may be generated from the vibrations, impacts, friction, etc. of machines and which may come into the products.

Generally, a small sized machine tool including a small sized machine robot has a casing covering the essential parts thereof. The casing is generally composed of a plurality of parts which are closely connected to each other, and generally has slight gaps or openings formed between the connected parts. Such gaps or openings may be neglected when the machine tool is used at a place where the problem of dusts is not a significant matter.

However such a machine tool is not suitable to be used in the clean spaced room where the above mentioned precision instruments and/or electronic parts are assembled or manufactured, because the gaps or openings of the casing will allow the dusts to come out of the casing into the clean space of the room and come into the products, the dusts being generated due to the impacts and vibrations which may be caused during the operations of the machine tool.

More particularly the dusts include the pulverized fine particles of metal, synthetic resin, gum, etc. which may be generated due to the abrasions of the working parts of the machine tool including the machine drive motor, the-mechanisms driven by the machine drive motor and the transmission belts provided between the machine drive motor and the driven mechanisms and between the driven mechanisms.

It is therefore required that the machine tool which is used in the clean spaced room has a device or function for preventing the dusts from being generated while the machine tool is operated. The machine tools having such dust generation preventing device or function have been known. However, the dust generation preventing device or the function part is totally big sized and complicated in structure.

Moreover, the casing of such machine tools has the slits formed thereat for air-cooling the machine drive motor. Such slits will easily allow the dusts to flow out of the casing. Further, the motor cooling fan will additionally increase the amount of dusts flowing out of the casing.

The invention has been provided to eliminate the defects and disadvantages of the prior art. It is therefore a principle object of the invention to provide an electric press with a dust generation preventing device which is simple in structure and effective in function and is moreover adapted to use in a clean spaced room.

It is another object of the invention to provide an air tight casing covering the essential parts of the machine tool.

Further it is another object of the invention to provide a pipe extending from the inside of the casing to the outside of the clean spaced room for blowing out the dusts generated in the casing into the outer air through the pipe.

SUMMARY OF THE INVENTION

In short, the present invention substantially relates to an electric press with a dust generation preventing device used in a clean spaced room and having the essential elements including a work pressing means including a ram, a drive means including an electric drive motor and a transmission means provided between the drive means and the work pressing means and transmitting the driving force of the drive means to the work pressing means reciprocatingly move the ram relative to a work to be pressingly processed, the electric press substantially comprising a casing structured airtight for covering the essential elements, a pipe elongated and having one end of thereof being located within the casing and the opposite end being located in an open air outside of the clean spaced room and an air absorbing means provided in connection with said pipe and operated to cause the air in the casing to flow through said pipe out into the open air outside of the clean spaced room.

DETAILED DESCRIPTION OF THE PREFERRED EMBODIMENTS

Figure 1:
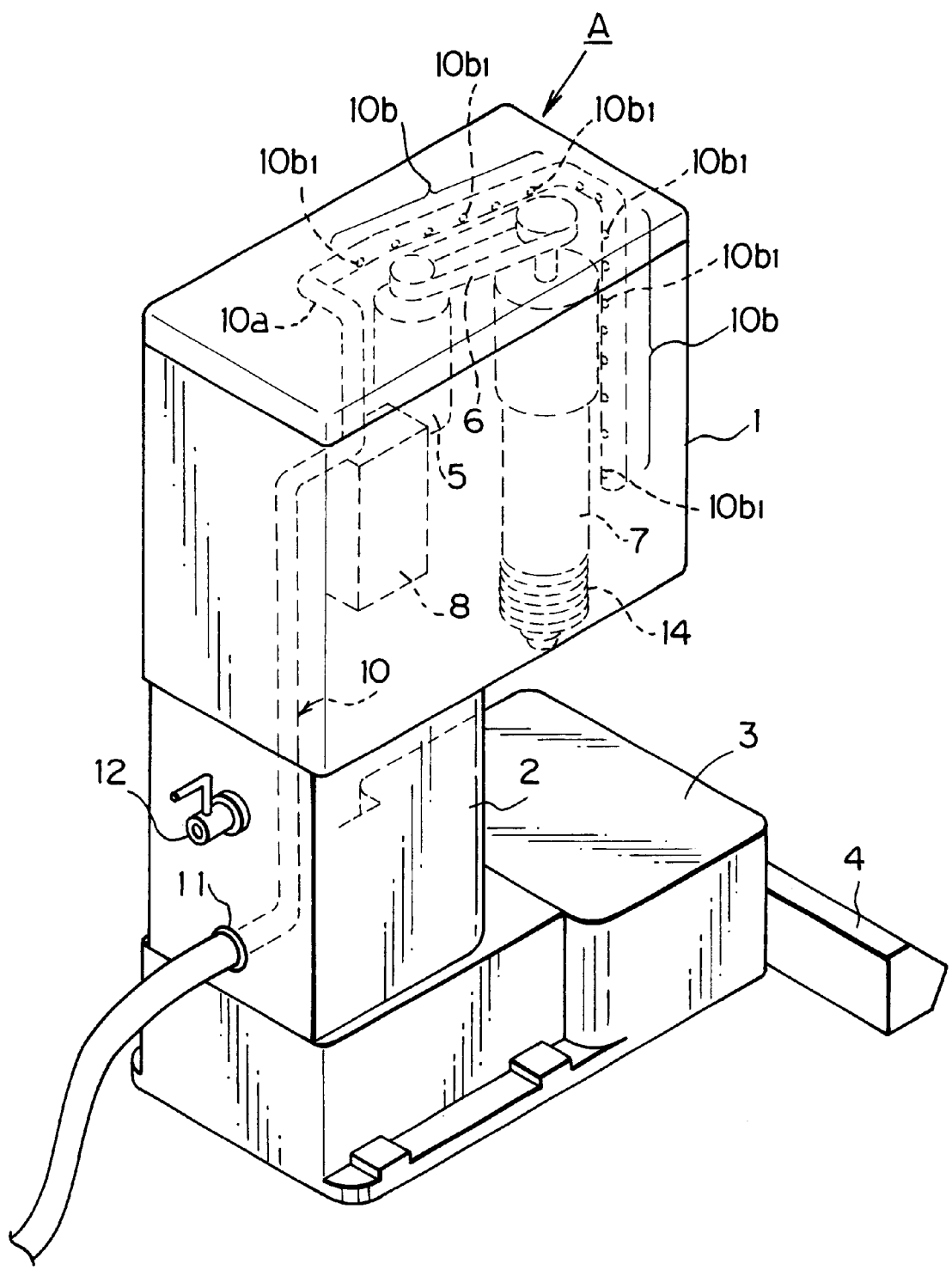
FIG. 1 is a perspective view of the electric press according to the invention.

The present invention will now be described in reference to the attached drawings. In reference to FIGS. 1 and 2, the electric press of the invention has an airtight casing A covering the upper essential parts of the electric press and a lower working bed 3. The casing A is composed of a head 1 and a column 2 extending from the head 1 to the working bed 3 for supporting thereon a work to be pressed.

The head 1 has an operation board (though not shown) provided on the front side thereof. The joint between the head 1 and the column 2 is sealed to be substantially airtight.

The working bed 3 has a controller 4 provided on the front side thereof. The column 2 of the casing A has the lower end fixedly connected to the upper surface of the working bed 3 and sealed to be airtight. In any case, the casing A must be airtight even if the casing is composed of more than the head 1 and the column 2.

In the casing A there are provided a drive part 5, a transmission part 6, a pressing part 7 and a control part 8 which are all movable with their own functions. More particularly, the drive part 5 includes an electric motor. The transmission part 6 is arranged between the drive part 5 and the pressing part 7 and includes pulleys 6a and a transmission belt 6b extended around the pulleys 6a.

The pressing part 7 is substantially composed of a ram 7a and a ram driving member 7b which is operated to move the ram 7a vertically of a work (not shown) placed on the working bed 3 to be pressed. The ram driving member 7b is of a cylindrical structure in which an elongated threaded member is rotated with ball bearings to vertically move the ram 7a with a stroke S relative to a work placed on the working bed 3 to be pressed by the ram 7a.

The ram 7a is axially covered with a vertically flexible dust boot 14. The dust boot 14 has the upper end sealingly connected to the lower end of the head 1 of the casing A and has the lower end sealingly connected to the lower part of the ram 7a such that the dust boot 14 may be vertically flexible with the vertical movements of the ram 7a, thereby to prevent the dusts from coming out of the casing A while the ram is vertically moved.

A dust absorbing pipe 10 is provided in the casing A. The dust absorbing pipe partly extends along a route adjacent to the moving vibration and/or impact generating elements including the drive part 5, the transmission part 6 and the work pressing part 7.

Figure 3:
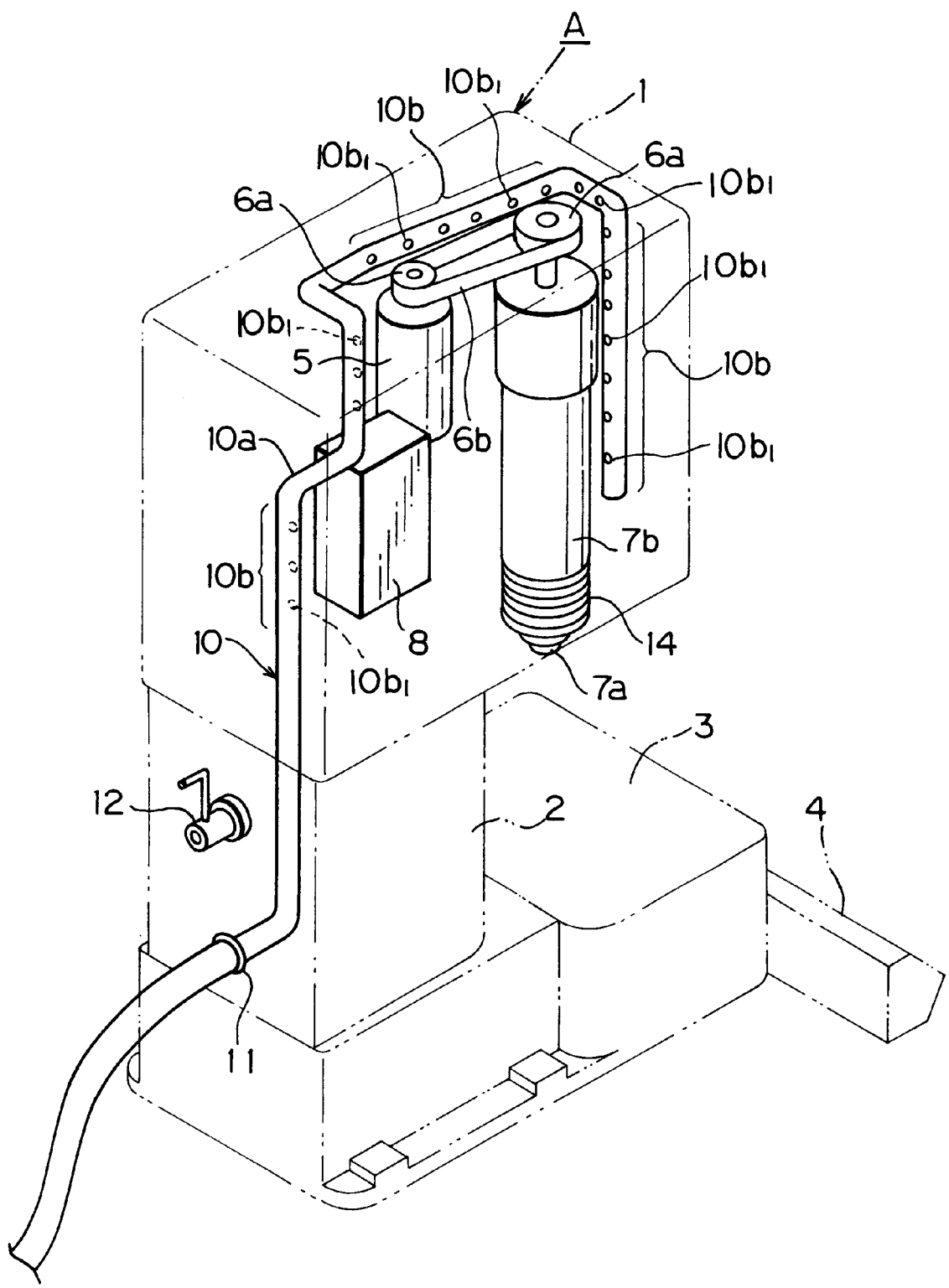
FIG. 3 is a perspective view of the electric press showing the inside of the casing of the electric press where the essential press elements and the dust absorbing pipe are arranged according to the invention.

As shown in FIG. 3, the dust absorbing pipe 10 includes a dust guiding portion 10a and a dust absorbing portion 10b and is made of the materials including a metal such as a stainless steel and a synthetic resin such as silicon gum.

Particularly the dust absorbing portion 10b is extended along the entire route around and adjacent to the moving and vibration and/or impact generating elements including the drive part 5, the transmission part 6 and the work pressing part 7.

Figure 4A:
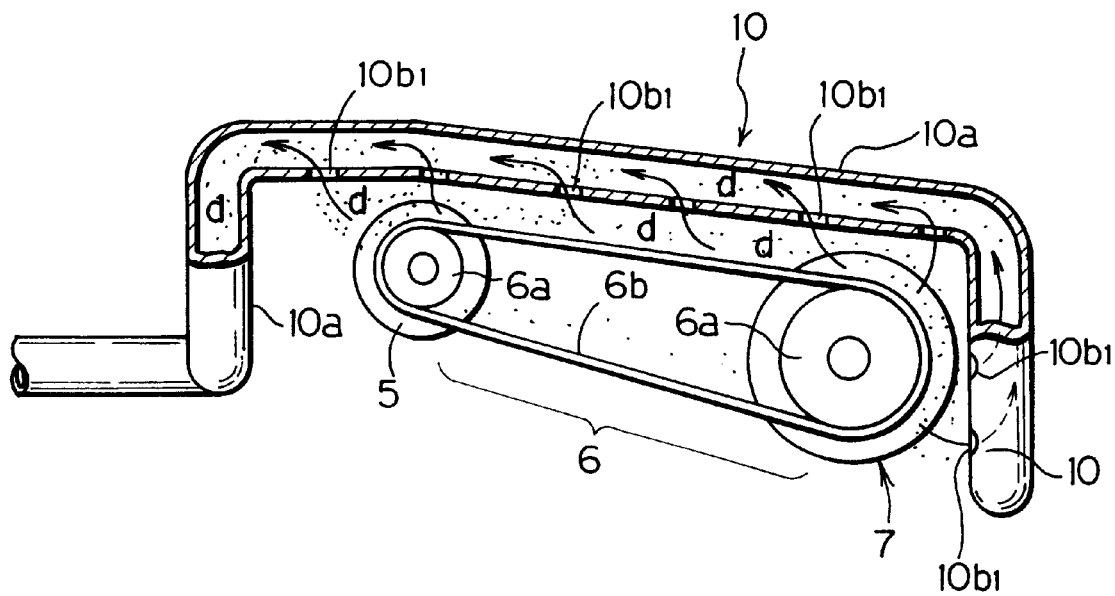
FIG. 4(A) is a plan elevational view of the essential press elements and the dust absorbing pipe partly shown and partly cut out to show the dust absorbing pipe for absorbing the dusts.
Figure 4B:
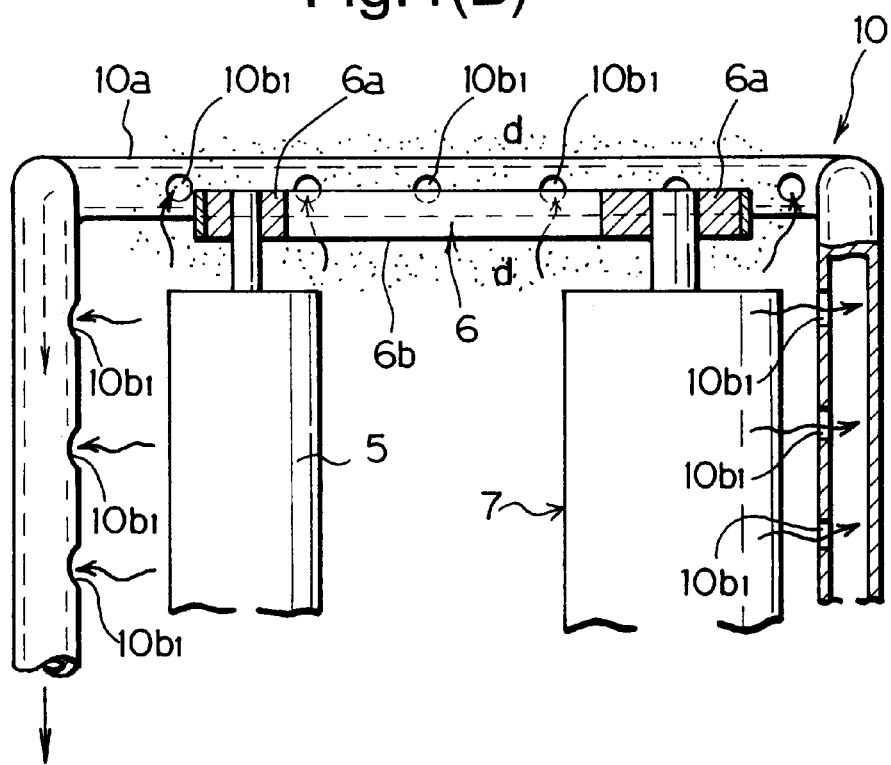
FIG. 4(B) is a side elevational view of the essential press elements and the dust absorbing pipe partly shown and partly cut out to show the pipe absorbing the dust
Figure 5:
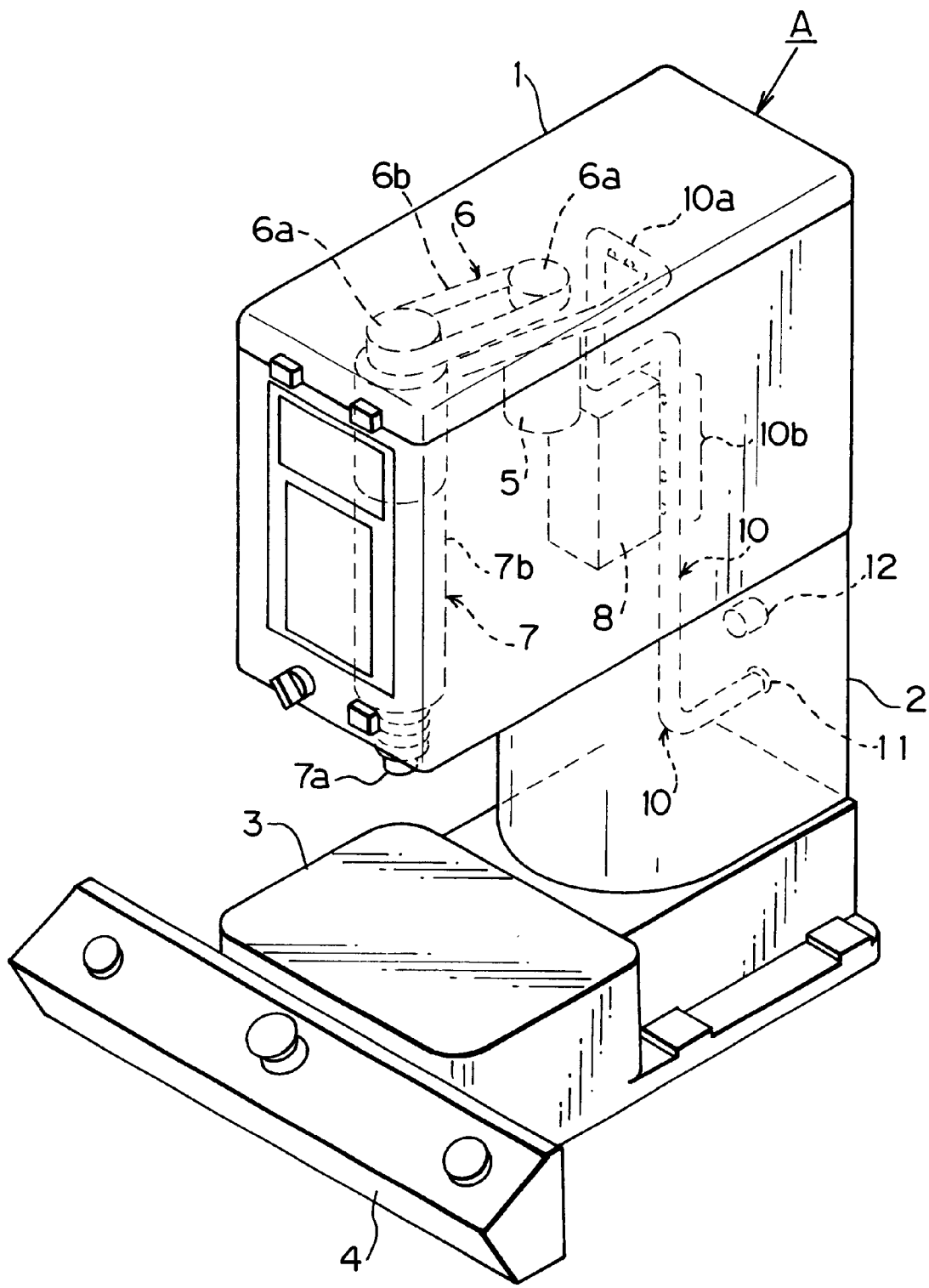
FIG. 5 is another perspective view of the electric press according to the invention.

The dust absorbing portion 10b has a plurality of apertures or openings $10b_1$ formed thereat with a predetermined interval provided therebetween for the purpose of absorbing thereat the dusts as well as the heat which will be generated from the drive part 5, the transmission part 6 and the work pressing part 7 and the control part 8 as shown in FIGS. 4(A) and (B). The apertures $10b_1$ may be circular or oval.

The dust absorbing pipe 10 has one end, that is, the end of the dust guiding pipe 10a, brought to an opening 11 provided at one side wall of the column 2 of the casing A where the dust absorbing pipe 10 is conductive with the outer air of the casing A.

A pressure adjusting valve 12 is provided on the casing A. The pressure adjusting valve 12 may be operated to adjust the atmospheric pressure which may be varied in the casing A due to the vertical motion of the ram 7. The pressure adjusting valve 12 may be a valve to be manually operated or to be electromagnetically operated with a pressure sensor.

Figure 2:
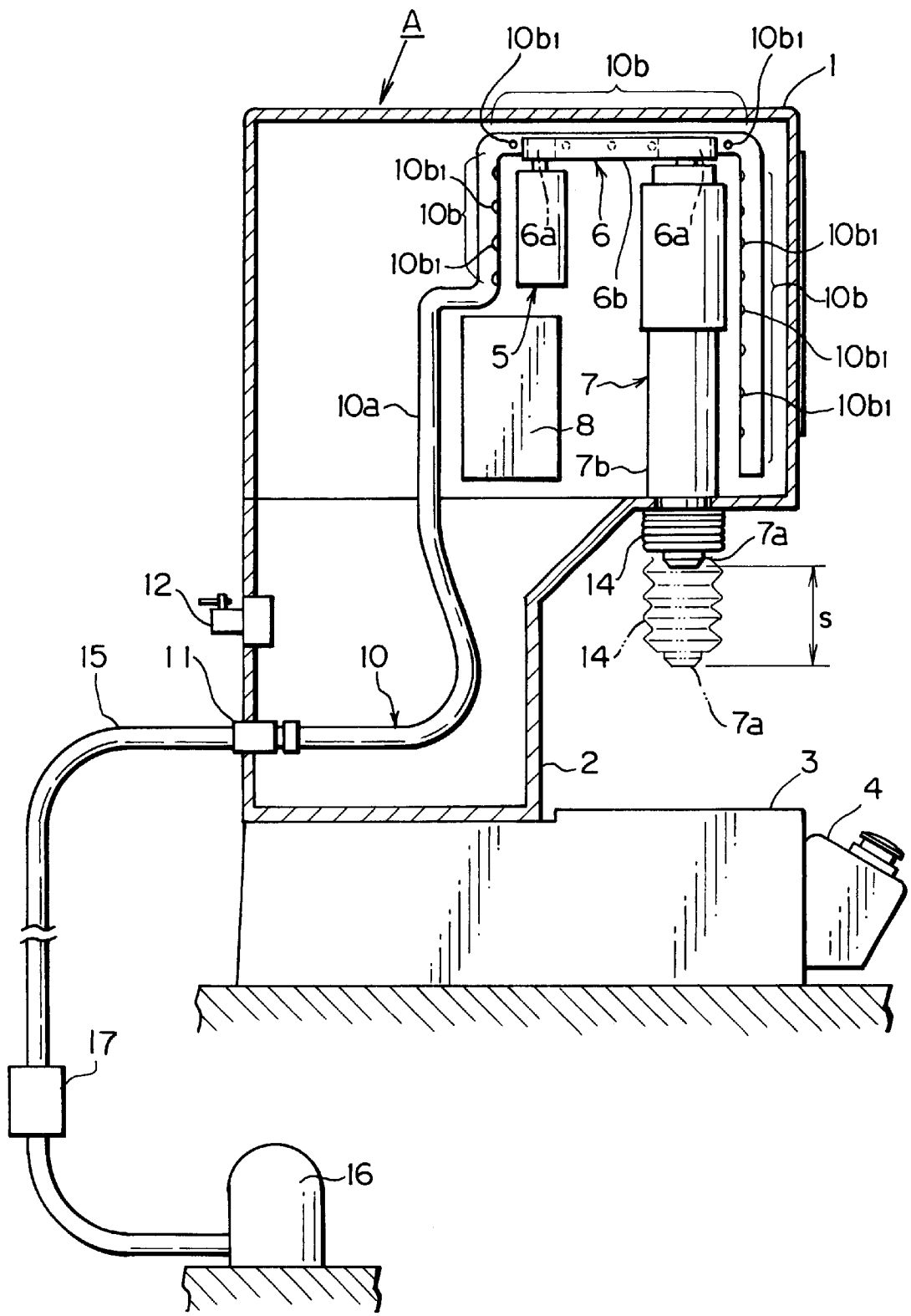
FIG. 2 is a side elevational view of the electric press shown partly in vertical section to show the inner essential elements of the electric press.

As shown in FIG. 2, the electric press of the invention has an outer pipe 15 extending therefrom to the outside of the clean spaced room for guiding the absorbed dusts out into the atmosphere outside of the clean spaced room where the electric press is located. The outer pipe 15 has one end connected to the end of the dust absorbing pipe 10 at the opening 11 of the casing A and has the opposite end connected to a blower 16 located outside of the clean spaced room. The blower 16 located outside of the clean spaced room. The blower 16 is operated to suck the dust generated within the casing A into the dust absorbing pipe 10, and blow the dust through the outer pipe 15 outside of the clean spaced room. A flow meter 17 may be provided to the outer pipe 15.

Figure 6:
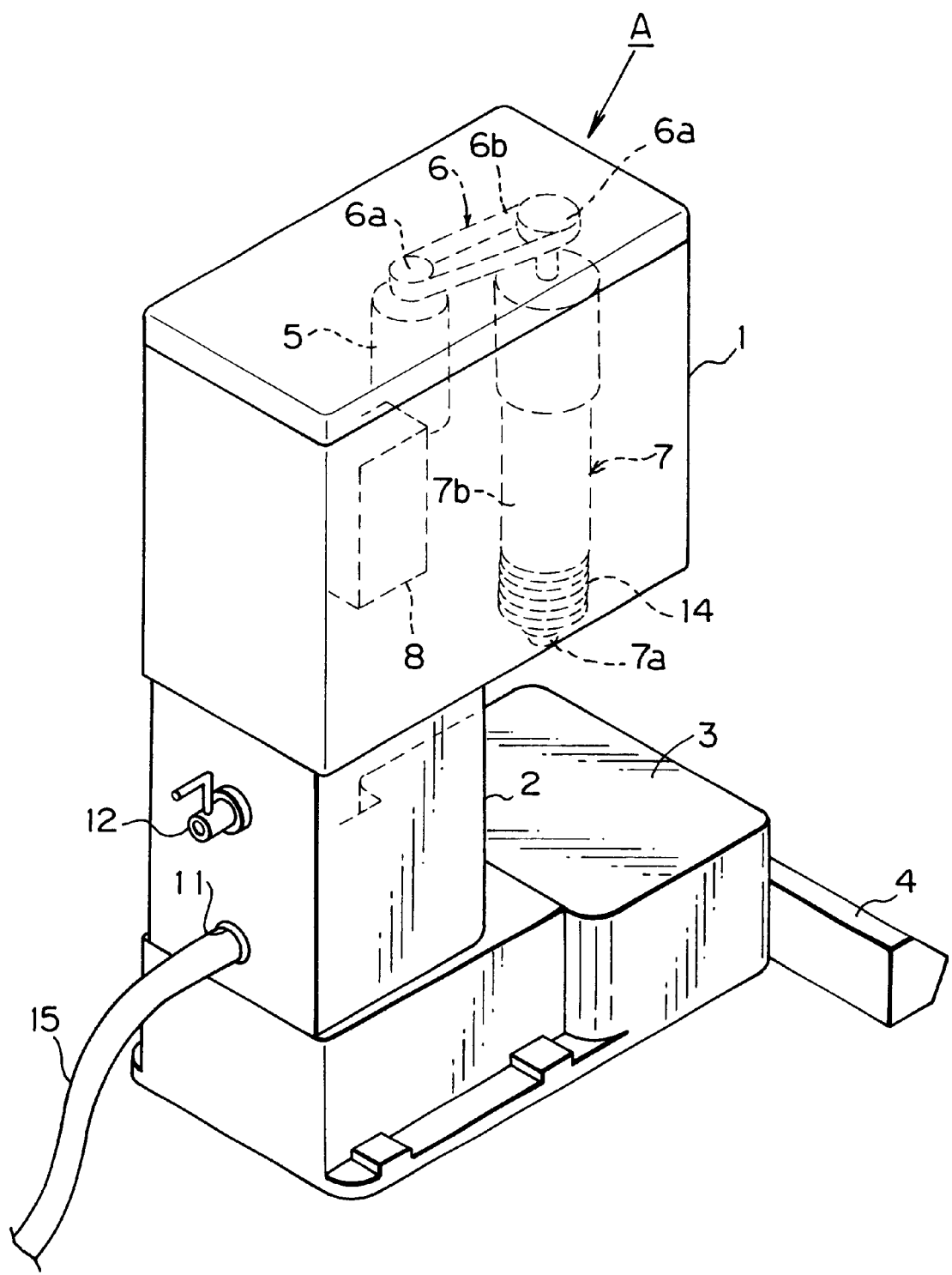
FIG. 6 is a perspective view of the electric press showing a second embodiment of the invention.
Figure 7:
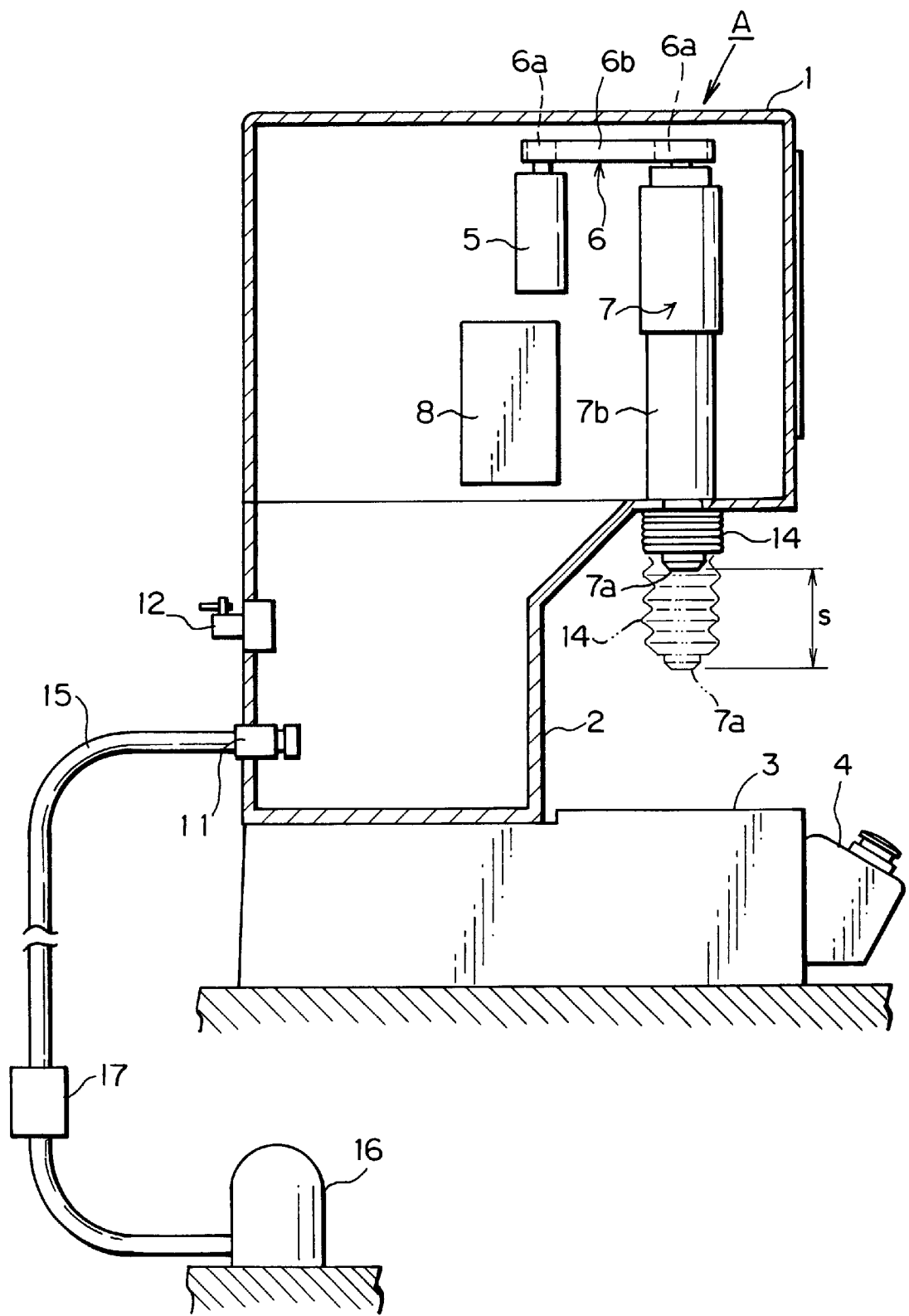
FIG. 7 is a side elevational view of the electric press shown partly in vertical section to show the inner essential elements of the second embodiment of the invention.

FIGS. 6 and 7 show a second embodiment of the invention, wherein the electric press has no dust absorbing pipe 10, which is provided in the first embodiment of the invention. According to the second embodiment, the outer pipe 15 has one end connected to the opening 11 of the casing A and has the opposite end connected to the blower 16 located outside of the clean spaced room in the same manner as in the first embodiment. In the second embodiment, the dusts generated in the casing A are absorbed at the opening 11 of the casing A and the absorbed dusts are blown out of the clean spaced room through the outer pipe 15 out into the outer atmosphere by the blower 16.

Figure 8:
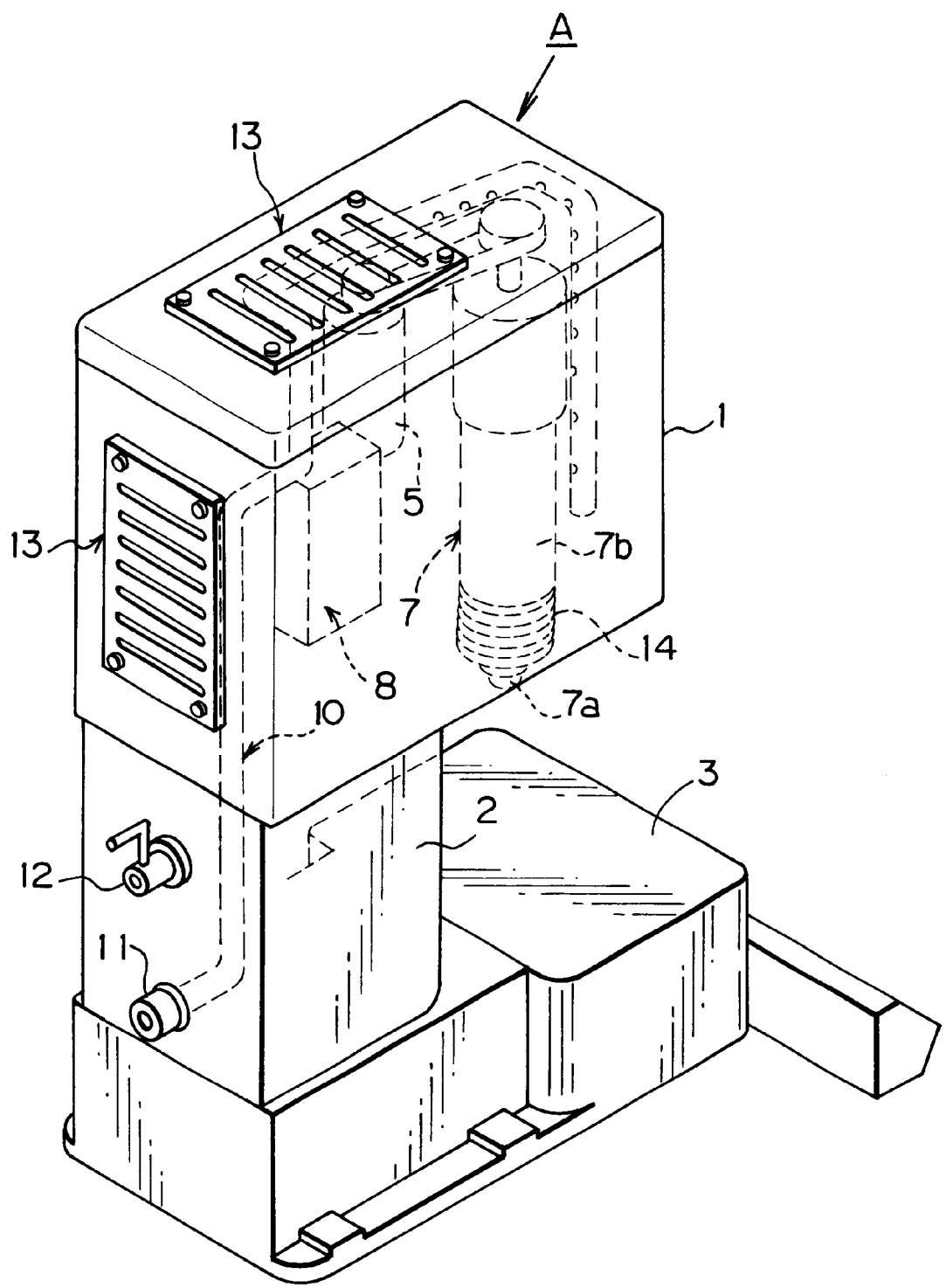
FIG. 8 is a perspective view of a third embodiment of the invention having air cooling slits provided to the casing of the electric press.

FIG. 8 shows a third embodiment of the invention, wherein the electric press has cooling slits 13 provided to the head 1 of the casing A such that the electric press may be functionally effective when it is used at a place other than the clean spaced room as well.

When the electric press is used at a place other than the clean spaced room, the cooling slits 13 are opened to allow the outer air to flow into the casing A, thereby to cool down the essential elements generating heat in the casing A including the drive part 5, the work pressing part 7 and the control part 8.

The cooling slits 13 may be optionally closed to render the casing A airtight. More particularly the cooling slits 13 are composed of a fixed group of slits collectively denoted by the reference numeral 13a and comprising a plurality of slits $13a_1$ and a group of slits $13b_1$ provided to a plate 13b as shown in FIG. 9(A).

Figure 9A:
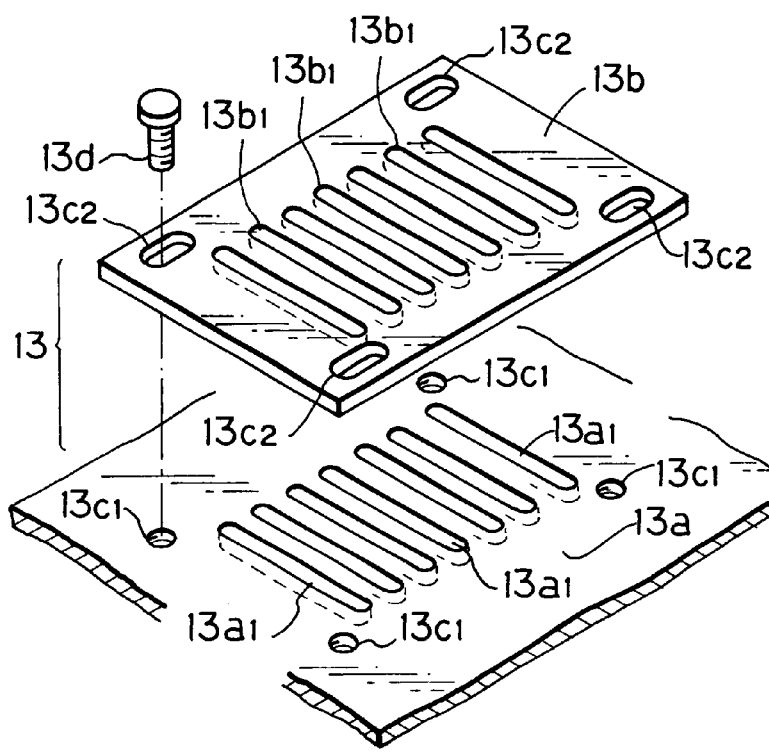
FIG. 9(A) is a perspective view of a movable group of air cooling slits and a fixed group of air cooling slits to be applied to the electric press.

As shown in FIGS. 8 and 9(A), the fixed group of slits 13a may be provided optionally to the top and side walls of the casing A in a manner that the respective slits $13a_1$ are arranged in parallel with each other with a predetermined interval provided therebetween.

The plate 13b has a plurality of slits $13b_1$ provided thereto in a manner that the respective slits $13b_1$ are arranged in parallel with each other with a predetermined interval provided therebetween. The plate is movably attached to the casing A in reference to the fixed group of slits 13a.

For the purpose of movably attaching the plate 13b to the casing A, an optional proper number of threaded holes $13c_1$ are provided to the casing A with reference to the fixed group of slits 13a. On the other hand, the same number of elongated openings $13c_2$ are provided to the plate 13b with reference to the slits $13b_1$. The plate 13b may be fixedly attached to the casing A by means of screws 13d which are inserted into the elongated openings $13c_2$ of the plate 13b respectively and threaded into the respective threaded holes $13c_1$ of the casing A.

Figure 9B:
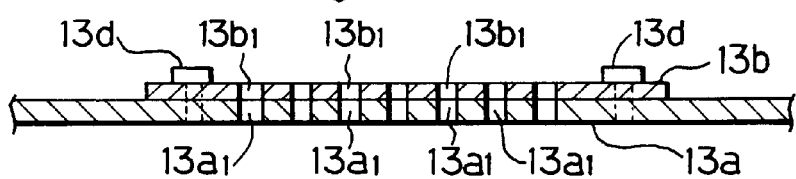
FIG. 9(B) is a side elevational view of the movable slits and the fixed slits shown in vertical section wherein the movable slits are moved with respect to the fixed slits to open the air cooling slits.
Figure 9C:
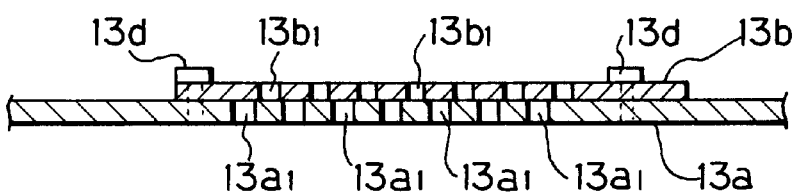
FIG. 9(C) is a side elevational view of the movable slits and the fixed slits shown in vertical section wherein the movable slits are moved with respect to the fixed slits to close the air cooling slits.

When the screws 13d are loosened, the plate 13b may be moved in the longitudinal directions of the elongated openings $13c_2$ to the place where the slits $13b_1$ are vertically in alignment with the slits $13a_1$ as shown in FIG. 9(B) and to the place where the slits $13b_1$ are displaced from the slits $13a_1$ to close the cooling slits 13, thereby to render the casing A airtight as shown in FIG. 9(C).

Figure 10:
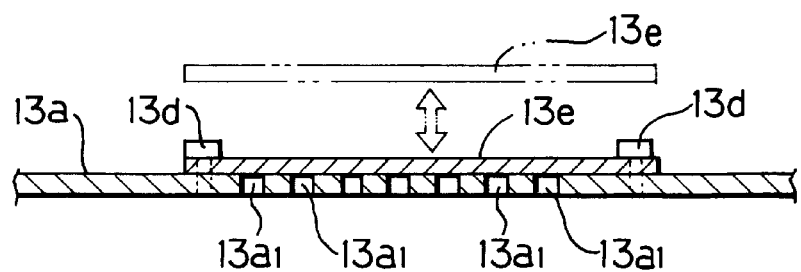
FIG. 10 is another embodiment of the cooling device shown in vertical section.

As shown in FIG. 10, the plate 13b may be replaced by a plate 13e having no slits provided thereto as shown in FIG. 10. The plate 13e is fixedly attached to the casing A by means of the screws 13d to close the slits $13a_1$ to render the casing A airtight. With the screw 23d being unscrewed, the plate 13e may be removed from the casing A to allow the outer air to flow into the casing A through the slits $13a_1$.

Although the invention has been described in conjunction with the specific embodiments thereof, it is to be understood that many variations and modifications may be made without departing from the spirit and scope of the invention as defined in the appended claims.

What is claimed is:

1. An electric press with a dust distribution preventing feature for use in a building space, said electric press comprising:

a plurality of essential elements which generate dust in operation, said essential elements including a work pressing element, a drive element for driving the work pressing element, and a transmission element provided between the drive element and the work pressing element for transmitting a driving force of the drive element to the work pressing element to move the work pressing element relative to a workpiece to be processed;

an airtight casing for covering said essential elements;

an elongated pipe having one end located within said casing and an opposite end located in open air outside said building space; and an air absorbing element communicated with said pipe and operated to cause air in said casing to flow through said pipe to the open air outside said building space;

wherein said elongated pipe has a portion provided with a plurality of apertures and extending along a route around and adjacent to said essential elements within said casing.

2. The electric press as defined in claim 1, wherein said pipe is made of one of metal and synthetic resin.

3. The electric press as defined in claim 2, wherein said pipe is made of one of stainless steel and silicon gum.

4. The electric press of claim 1, wherein the work pressing element includes a ram and the drive element includes an electric motor.

5. An electric press with a dust distribution preventing feature for use in a building space, said electric press comprising:

a plurality of essential elements which generate dust in operation, said essential elements including a work pressing element, a drive element for driving the work pressing element, and a transmission element provided between the drive element and the work pressing element for transmitting a driving force of the drive element to the work pressing element to move the work pressing element relative to a workpiece to be processed;

a casing comprising a plurality of walls structured to make said casing airtight, said casing covering said essential elements;

an elongated pipe having one end located within said casing and an opposite end located in open air outside said building space; and a blower communicated with said pipe and operated to absorb air from within said casing into said pipe and cause the absorbed air to flow through said pipe to the open air outside said building space;

wherein said elongated pipe comprises a first portion provided with a plurality of apertures and extending along a route around and adjacent to said essential elements within said casing, and a second portion having one end thereof connected to said first portion at an opening formed on one of said walls of said casing and extending out of said building space.

6. The electric press as defined in claim 5, wherein said pipe is made of one of metal and synthetic resin.

7. The electric press as defined in claim 6, wherein said pipe is made of one of stainless steel and silicon gum.

8. The electric press of claim 5, wherein the work pressing element includes a ram and the drive element includes an electric motor.

9. An electric press with a dust distribution preventing feature for use in a building space, said electric press comprising:

a plurality of essential elements which generate dust in operation, said essential elements including a work pressing element, a drive element for driving the work pressing element, and a transmission element provided between the drive element and the work pressing element for transmitting a driving force of the drive element to the work pressing element to move the work pressing element relative to a workpiece to be processed;

a casing comprising a plurality of walls structured to make said casing airtight, said casing covering said essential elements;

an elongated pipe having one end located within said casing and an opposite end located in open air outside said building space;

a blower communicated with said pipe and operated to absorb air from within said casing into said pipe and cause the absorbed air to flow through said pipe to the open air outside said building space; and at least one cooling passage formed through at least one of said walls of said casing and configured to be (i) closed in a hermetical manner when the airtightness of said casing needs to be maintained and (ii) opened for allowing outside air to flow into said casing to cool down said essential elements within said casing when the airtightness of said casing needs not be maintained;

wherein said elongated pipe comprises a first portion provided with a plurality of apertures and extending along a route around and adjacent to said essential elements within said casing, and a second portion having one end thereof connected to said first portion at an opening formed on one of said walls of said casing and extending out of said building space.

10. The electric press as defined in claim 9 wherein said pipe is made of one of metal and synthetic resin.

11. The electric press as defined in claim 10, wherein said pipe is made of one of stainless steel and silicon gum.

12. The electric press of claim 9, wherein the work pressing element includes a ram and the drive element includes an electric motor.

13. An electric press with a dust distribution preventing feature for use in a building space, said electric press comprising:

a plurality of essential elements which generate dust in operation, said essential elements including a work pressing element, a drive element for driving the work pressing element, and a transmission element provided between the drive element and the work pressing element for transmitting a driving force of the drive element to the work pressing element to move the work pressing element relative to a workpiece to be processed;

an airtight casing for covering said essential elements;

an elongated pipe having one end located within said casing and an opposite end located in open air outside said building space; and an air absorbing element communicated with said pipe and operated to cause air in said casing to flow through said pipe to the open air outside said building space;

wherein the work pressing element includes a ram and the drive element includes an electric motor; and said ram is extendable to project out of said casing while remaining hermetically sealed therewith for pressing said workpiece placed outside said casing.

* * * * *